United States Patent
Hill

(10) Patent No.: US 12,351,332 B2
(45) Date of Patent: Jul. 8, 2025

(54) AIRCRAFT FLIGHT CONTROL

(71) Applicant: HILL GROUP TECHNOLOGIES LIMITED, Stafford (GB)

(72) Inventor: Jason Hill, Rugeley (GB)

(73) Assignee: HILL GROUP TECHNOLOGIES LIMITED, Stafford (GB)

( * ) Notice: Subject to any disclaimer, the term of this patent is extended or adjusted under 35 U.S.C. 154(b) by 0 days.

(21) Appl. No.: 18/022,501

(22) PCT Filed: Aug. 23, 2021

(86) PCT No.: PCT/GB2021/052185
§ 371 (c)(1),
(2) Date: Feb. 21, 2023

(87) PCT Pub. No.: WO2022/038383
PCT Pub. Date: Feb. 24, 2022

(65) Prior Publication Data
US 2023/0312083 A1 Oct. 5, 2023

(30) Foreign Application Priority Data
Aug. 21, 2020 (GB) .................................. 2013139

(51) Int. Cl.
*B64D 43/00* (2006.01)
*B64C 13/04* (2006.01)
*B64C 13/18* (2006.01)

(52) U.S. Cl.
CPC .......... *B64D 43/00* (2013.01); *B64C 13/0421* (2018.01); *B64C 13/18* (2013.01)

(58) Field of Classification Search
None
See application file for complete search history.

(56) References Cited

U.S. PATENT DOCUMENTS 3,885,325 A * 5/1975 Sidoti ..................... G09B 9/16
D12/192
5,472,156 A * 12/1995 Bivens, III .............. B64C 27/56
244/234

(Continued)

FOREIGN PATENT DOCUMENTS

EP 2397928 A1 * 12/2011 ............... G05G 1/62
EP 4200205 A 6/2023

(Continued)

OTHER PUBLICATIONS

AOPA.org, "Cirrus offers Entegra Release 9" retrieved from "https://www.aopa.org/news-and-media/all-news/2009/november/05/cirrus-offers-entegra-release-9", 1 Page.

(Continued)

*Primary Examiner* — Fekadeselassie Girma
(74) *Attorney, Agent, or Firm* — Bochner PLLC; Andrew Bochner

(57) ABSTRACT

Disclosed is a pilot aircraft system control input arrangement for a light aircraft having primary flight controls, the pilot aircraft system control input arrangement integrated into an armrest for a pilot's seat, the armrest providing forearm support for a pilot and having integrated therein or associated therewith a primary flight control and wherein the pilot aircraft system control input arrangement is disposed to be reached by fingers of a pilot with their forearm resting on the armrest, the pilot system control input arrangement comprising: a numerical keypad interface for inputting data; a rotatable selector for inputting data; a function selector operable to switch the pilot input arrangement between at least two input functions that each enable the pilot input arrangement to receive a different type of input, wherein the types of input for the at least two input functions are selected from at least two of the following input categories: a pressure setting for an altimeter; a transponder code for a (Continued)

transponder; a frequency for radio or navigation equipment; a course or heading for an autopilot or navigation equipment; an interfacing arrangement for communicating inputs to at least two aircraft systems selected from: an altimeter; a transponder; a radio; a navigation system; and an autopilot system.

19 Claims, 6 Drawing Sheets

(56) References Cited

U.S. PATENT DOCUMENTS

| | | | |
|---|---|---|---|
| 7,467,037 B2 * | 12/2008 | Donk | B60K 35/10 |
| | | | 701/1 |
| 8,028,960 B2 | 10/2011 | Van Wassenhove et al. | |
| 10,683,100 B2 | 6/2020 | Bilbrey et al. | |
| 11,788,294 B2 * | 10/2023 | Stacye | E04D 13/08 |
| | | | 52/16 |
| 2008/0208396 A1 * | 8/2008 | Cairola | G06F 3/011 |
| | | | 701/1 |
| 2013/0015964 A1 * | 1/2013 | Muller | G06F 3/0362 |
| | | | 340/459 |
| 2013/0133469 A1 * | 5/2013 | Rey | B64C 13/0421 |
| | | | 74/558.5 |
| 2018/0366090 A1 * | 12/2018 | Shatzki | G09G 5/37 |
| 2022/0041267 A1 * | 2/2022 | De Freitas | B64C 27/56 |

FOREIGN PATENT DOCUMENTS

| | | | | |
|---|---|---|---|---|
| GB | 2602954 B | 9/2024 | | |
| RU | 2619794 C1 | 5/2017 | | |
| WO | WO-2010146656 A1 * | 12/2010 | | G05G 5/065 |
| WO | 2022038383 | 2/2022 | | |

OTHER PUBLICATIONS

Combined Search and Examination Report of the United Kingdom Patent Office in related UK Patent Appl. No. GB2013139.7, dated Apr. 15, 2021, 6 pages.
Examination Report of the United Kingdom Patent Office in related UK Patent Appl. No. GB2013139.7, dated Dec. 21, 2022, 5 pages.
Examination Report of the United Kingdom Patent Office in related UK Patent Appl. No. GB2013139.7, dated Feb. 5, 2024, 4 pages.
Examination Report of the United Kingdom Patent Office in related UK Patent Appl. No. GB2013139.7, dated Jun. 20, 2023, 6 pages.
Examination Report of the United Kingdom Patent Office in related UK Patent Appl. No. GB2013139.7, dated Sep. 22, 2023, 4 pages.
International Search Report and Written Opinion of the International Searching Authority in relation to International Application No. PCT/GB2021/052185, dated Nov. 18, 2021, 13 pages.
Office Action of the European Patent Office in related European Patent Appl. No. 21777821.6, dated Sep. 6, 2024, 4 pages.
Screen captures from YouTube video clip entitled "Carenado DA62 G1000 FSX/P3D V1.1" 2 pages, uploaded on Oct. 6, 3029 by user "Carenado Channel". Retrieved from Internet: https://www.youtube.com/watch?v=JmgmfkkfwKg.

* cited by examiner

AIRCRAFT FLIGHT CONTROL

FIELD OF THE INVENTION

The present application relates to control apparatus for aircraft. In particular, the application relates to user interfaces and flight deck arrangements for pilots of light helicopters and light fixed-wing aircraft.

BACKGROUND OF THE INVENTION

Aircraft controls are numerous and complex. Pilots of helicopters and fixed-wing aircraft, such as aeroplanes, need to read various instruments monitoring different aspects of the aircraft's flight such as altitude, airspeed, vertical speed and heading. Instrument displays are normally provided on an instrument panel in front of the pilot's seat, so they are in the pilot's line of sight.

Pilots also need to input control commands to the aircraft, such as pitch, roll, attitude and power (using primary flight controls), as well as inputting system or numerical control data such as radio frequencies, transponder codes and autopilot settings. The inputs for these may vary and be in different places in a cockpit. For example speed, elevation and steering may be controlled by levers or handles within reach of the pilot while seated. In a helicopter these may be provided by a collective lever to the left of the pilot's seat to control collective pitch of the main helicopter rotor blades, a joystick-style cyclic handle positioned between the pilot's legs to change the direction of movement of the helicopter (or pitch and roll) by controlling blade pitch at different points in rotation, and anti-torque pedals located on the floor under the pilot's feet to change the tail rotor blade pitch. A throttle control may also be provided in the form of a twist grip on the collective lever. Input buttons for autopilot controls, radio controls, transponder inputs or altimeter inputs are generally provided at various positions on the instrument panel in front of the pilot's seat. Instruments and other aircraft equipment, such as altimeters, radios, autopilots and transponders are often provided separately in modular units, each with their own input interface. This gives flexibility as to which equipment is chosen (from different suppliers and/or of different specifications), but means the pilot must use multiple different user inputs and interfaces during flight.

For completeness, it is noted that wide bodied jets, large aircraft and aircraft simulators which have larger cockpits or indeed no cockpit in the case of a simulator may have various control arrangements but these are not constrained for space and are largely irrelevant to light aircraft. By light aircraft is preferably meant an actual aircraft or helicopter having a passenger capacity of 10 or less and/or a cockpit width of no more than 2.5 m and/or a maximum takeoff mass of 5.7 tonnes or less and/or an aircraft intended for substantial visual flight rules flight. In light aircraft the primary flight controls are generally presented to the pilot and there is little space between pilots (if indeed there are two abreast) and system controls are on the instrument panel ahead and in front so as to be visible with the pilot looking ahead and out of the window and flying visually rather than largely on instruments and by autopilot as in a larger commercial aircraft.

There is a lot of different information to keep track of simultaneously and several inputs are often required at the same or similar times, which makes conventional systems difficult and laborious to use. There is a need to provide improved systems to make it easier for pilots to input flight data and control commands in light aircraft.

SUMMARY OF THE INVENTION

Aspects of the invention are set out in the independent claims and preferable features are set out in the dependent claims.

There is described herein a pilot input arrangement for a light aircraft, the pilot control input arrangement integrated into an armrest for a pilot's seat, the armrest providing forearm support for a pilot and wherein the pilot control input arrangement is disposed to be reached by fingers of a pilot with their forearm resting on the armrest, the pilot control input arrangement comprising: a numerical keypad interface for inputting data; a rotatable selector for inputting data; a function selector operable to switch the pilot input arrangement between at least two input functions that each enable the pilot input arrangement to receive a different type of input, wherein the types of input for the at least two input functions are selected from at least two of the following input categories: a pressure setting for an altimeter; a transponder code for a transponder; a frequency for radio or navigation equipment; a course or heading for an autopilot or navigation equipment; an interfacing arrangement for communicating inputs to at least two aircraft systems selected from: an altimeter; a transponder; a radio; a navigation system; and an autopilot system.

Providing a single input arrangement that allows at least two different categories of input for the aircraft to be enterable is particularly helpful as input can be done more quickly, without having to switch between different user interfaces at different places in an aircraft cockpit. This can free up pilot time and attention and improve flight safety. A function selector to switch the pilot control input arrangement between two different input functions allows a single, relatively small arrangement or interface to be used to input multiple different types of data. This means more space in the cockpit can be provided for other interfaces, such as screens for entertainment or navigation, or flight instruments.

Positioning the pilot control input arrangement in an armrest of a pilot's seat means the inputs are in a convenient position for the pilot to reach when in a relaxed position with their arm resting on the armrest. This provides an improved pilot experience and is safer as key inputs that may need to be controlled by the pilot are easily to hand, rather than the pilot needing to move their hand significantly to reach input in potentially different parts of the aircraft cabin, which may diminish their view of other instruments or of the space outside the aircraft. An elbow support part of the armrest may be provided within 50 cm of the pilot input arrangement, preferably within 40 cm or within 30 cm, in order to allow the pilot to reach the pilot input arrangement easily.

Advantageously by providing a numerical keypad and a rotatable selector for pilot inputs it is possible to enter a value using the numerical keypad and to adjust or "jog" the value using the rotatable selector, which can lead to a more streamlined and accurate entering process.

The pilot input arrangement can be switched by the function selector between being able to receive an input of a first category and an input of a second category. In other words, the pilot input arrangement may have different input modes (at least two), and in each input mode the pilot input arrangement is operable to receive a different input. The pilot input arrangement can switch between input modes that have at least two different categories of input.

In preferred embodiments the pilot input arrangement can switch between being operable to receive inputs from at least three of the categories, more preferably all four categories of input. Allowing inputs from all four different categories to be entered at a single point is particularly helpful.

Switching between input functions may comprise switching between different input modes. For example, in each input mode the pilot control input arrangement may be configured to receive a different type of data or command. In some embodiments, the pilot control input arrangement may be configured to receive two different types of data or commands concurrently. For example, the numerical keypad may be configured to receive a first type of data or command whilst at the same time the rotatable selector is configured to receive a second type of data or command different from the first type.

Switching between input functions may comprise putting the input arrangement into a state, or making the input arrangement operable, to send an input or input data to one of the aircraft systems associated with the input function. Each input function may specify, or be associated with, a particular input type or category and a particular aircraft system or device to which to send the input.

The navigation equipment may be a navigation aid and may require frequency inputs as well as heading and/or course inputs.

The function selector is operable to switch between different input functions, or modes, of the pilot input arrangement based on a user selection of the particular input function or mode. In some embodiments the function selector is operable to receive a selection of the function from a user via the rotatable selector. Alternatively or additionally one or more separate user interface features (such as permanent physical buttons, programmable (physical) soft keys or displayable buttons or options on a touchscreen) may be provided to receive a user selection for the function selector.

The rotatable selector may be in the form of a raised button that protrudes from the surface of the pilot control input arrangement. The rotatable selector can be rotated to toggle or scroll between different options presented to a user, e.g. in the form of a menu or list of options. Alternatively or additionally (e.g. dependent on the current input function selected), the rotatable selector can be rotated to increase or decrease a numerical input value. For example, rotating clockwise may increase the value and rotating anti-clockwise may decrease the value. In some examples the rotatable selector, or part thereof, may be depressible and depressing the rotatable selector may cause the current numerical value or currently selected option to be confirmed or input into the pilot control input arrangement.

A light aircraft may be capable of handling at least 4 occupants and at most 6 occupants including a pilot. A light aircraft may additionally or alternatively have an empty mass of less than 1000 kg and a maximum gross mass of between 1050 kg and 2000 kg. In other words the maximum capacity is between around 50 kg and 1000 kg.

A user may be able to confirm an input by pushing a button, such as an "enter" or "confirm" button, on the numerical keypad. The user may also be able to confirm an input by depressing all or part of the rotatable selector.

The numerical keypad interface for inputting data may be a numerical keypad of touch-sensitive buttons displayed on a touchscreen or may comprise a physical keypad comprising physical buttons that may be depressible, and preferably protrude or are raised from the surface of the pilot control input arrangement. The rotatable selector will generally be a physical rotatable selector, such as a button, or rotatable puck.

Where the numerical keypad is provided on a touchscreen, a display operable to display pilot inputs may be provided on the same touchscreen, or may be provided on a separate display. For example, pilot inputs may be provided on a separate screen or display on or near the instrument panel, generally in front of the pilot, that is operable to show any input received by the pilot input arrangement. Such a screen may also indicate the type or category of input, e.g. the function or mode selected or currently in use. Alternatively or additionally the pilot inputs may be sent or communicated to the relevant aircraft system/instrument and displayed on a display of the relevant aircraft system that is viewable by the pilot.

The interfacing arrangement may comprise a physical communication interface, such as a wired interface for connecting the pilot input arrangement to the aircraft systems, or the interfacing arrangement may comprise a wireless communication interface, such as WiFi (IEEE 802.11), Bluetooth (IEEE 802.15) or Zigbee (IEEE 802.15.4) or other radio frequency communication, for communication with the aircraft systems. In some embodiments the interfacing arrangement provides both wired and wireless communication with different of the aircraft systems.

When installed the interfacing arrangement is communicably coupled to at least two of the following aircraft systems: an altimeter; a transponder; a radio; a navigation system; and an autopilot system. The interfacing arrangement may also be communicably coupleable to one or more mobile computing devices such as a tablet computer and/or a mobile telephone or smartphone. Coupling to mobile computing devices is preferably provided by a wireless connection, such as Wi-Fi or Bluetooth, but in some embodiments a wired connection point to allow communication (and optionally charging) may alternatively or additionally be provided.

Preferably, the function selector is operable to: receive a first user selection indicative of a selected aircraft system from the at least two aircraft systems; receive a second user selection indicative of the category of input for the aircraft system from the at least two categories of input; and switch the pilot input arrangement to being operable to receive an input of the selected category on the basis of the first user selections; and cause the interfacing arrangement to communicate an input of the selected category of input received via the numerical keypad interface or rotatable selector to the selected aircraft system.

Selectable options for the user to select from the aircraft systems and/or from the category or type of input may be provided to the user in the form of user interface features such as permanent physical buttons, programmable (physical) soft keys or displayable buttons or options on a touchscreen. Alternatively or additionally user selection for the function selector may be received via the rotatable selector, such as by rotating the rotatable selector to scroll through options. When the desired option is highlighted or otherwise marked using the rotation, the function may be selected and sent to the function selector by depressing the rotatable selector or selecting the option in another manner, such as via a button on the numerical keypad or an additional button.

Thus the function selector may be further operable to cause the pilot input arrangement to display selectable options for aircraft systems and/or categories of input, for example on a screen or touchscreen of the pilot input arrangement, prior to receiving the first and second user selections.

The function selector may comprise one or more physical buttons, softkeys or touchscreen buttons to allow user selection of the at least two different input functions.

Where touchscreen buttons are provided there may be integrated hand holds. In some embodiments the touch screen may be configured such that a force above a predetermined threshold is required to make an input on the touchscreen. For example, a force of at least 0.5 N or at least 1 N. In some embodiments the threshold for the force required to trigger an action on the touchscreen is between around 0.3 N and 5 N, preferably between around 0.5 N and 3 N. This means a firm action is required to make an input, which can avoid accidental inputs, which is particularly useful when vibrations or turbulence is encountered in an aircraft.

Generally the pilot input arrangement does not perform any functions of an aircraft system. Thus although the pilot input arrangement has an interface for communicating with aircraft systems, it cannot actually perform any avionics functions. The pilot input arrangement is only operable to receive user inputs and cannot provide functions of aircraft systems, such as radio communication, navigation, altitude monitoring or autopilot control of the aircraft.

Preferably the pilot input arrangement further comprises: a joystick-style input element such as a pointing stick for receiving user input.

For example, the joystick-style input element may be used to move a cursor displayed on a screen of the pilot input arrangement or of another aircraft system.

A pointing stick (nub or nipple) is a small joystick that reacts to sustained force or strain rather than to gross movement. It has an advantage in that the input can be felt by the user more easily so it can be helpful in aircraft, where vibrations and turbulence are often an issue.

The pilot control input arrangement may have an area of less than around 600 cm$^2$, preferably less than around 400 cm$^2$, more preferably less than around 200 cm$^2$.

Providing a pilot control input arrangement with a small area improves ease of use because the pilot does not have to move their hands far to access any of the controls.

The area of the pilot control input arrangement can be the surface area of the pilot control arrangement that is visible when installed, or the parts of the arrangement that can be seen by a user, such as the pilot. The part of the pilot control input arrangement that is visible to the user may be substantially planar in shape (perhaps with one or more protruding buttons, knobs and/or features such as screens). Thus the area referred to above may be the surface area of the substantially planar part of the input arrangement. The surface of the pilot control input arrangement may be arranged to be substantially horizontal when installed in the aircraft.

The area of the pilot control input arrangement will generally be at least around 50 cm$^2$, preferably at least around 100 cm$^2$, or around 300 cm$^2$. An example size for the pilot input arrangement is around 100×250 mm.

Preferably the numerical keypad interface, rotatable selector; and function selector are all within 20 cm of each other, preferably within 15 cm or within 12 cm.

In other words, the greatest distance between any two of the numerical keypad, function selector and rotatable selector button does not exceed 20 cm, preferably does not exceed 15 cm or even 12 cm. This provides an arrangement that can be easily accessed by the pilot in a short timeframe and using only one hand.

The pilot input arrangement may, further comprise: a display operable to display inputs received via the numerical keypad interface and the rotatable selector.

In some embodiments this display may comprise a touchscreen that is also operable to provide one or both of the keypad interface and the function selector.

Optionally the function selector is further operable to switch the pilot input arrangement to be operable to receive an airspeed input for the autopilot.

The pilot input arrangement would then communicate the airspeed input to the autopilot via the interfacing arrangement.

Preferably the function selector is further operable to switch the pilot input arrangement to be operable to receive a control input for a ground handling system, for example speed and/or direction inputs for ground movement, and wherein the interfacing arrangement is configured to communicate inputs to the ground handling system.

The function selector may be further operable to switch the pilot input arrangement to be operable to receive a climate control setting, and wherein the interfacing arrangement is configured to communicate inputs to climate control equipment for the aircraft, preferably for the aircraft cockpit. Climate control settings may include temperature and fan settings.

In some embodiments the function selector is operable to switch the pilot input arrangement to be operable to receive at least one of, and preferably all of: a speed input, an altitude input and a navigation input; and the interfacing arrangement is configured to communicate the speed input, the altitude input and/or the navigation input to one or both of an autopilot system; and navigation equipment.

The interface may also be capable of coupling to an aircraft entertainment system, such as a music or video display system, and/or to a communication system, such as a telephone system.

In some embodiments the rotatable selector comprises a depressible button for selecting one or more functions or control commands or for confirming input data.

Preferably the rotatable selector comprises: an outer rotatable portion; and an inner depressible button.

The inner depressible button and outer rotatable portions may be coaxially arranged. The outer rotatable portion can be rotated around the inner depressible portion, whilst the inner depressible portion does not move. Where the rotatable selector is generally cylindrical in shape, each of the outer rotatable portion and inner depressible portion may also be cylindrical in shape.

In some embodiments the outer rotatable portion may also be depressible. For example, pressing the outer rotatable portion may allow the user to confirm or input a value that they have selected or adjusted by rotating the outer rotatable portion.

By providing a rotatable selector as a physical feature in this manner it is easier for the pilot to input functions while controlling the aircraft. The pilot may have several different things to concentrate on and look at at the same time and providing a rotatable feature with an inner depressible button means it is easier to provide input since the pilot need not move their hand as they input information or control commands via the rotatable selector and does not need to look at their hand while there are entering information as it can be done using a single physical feature, as opposed to, for example, a keypad or touchscreen interface.

Preferably, the inner depressible button is movable between an up position and a down position, wherein in the up position the inner depressible button protrudes from the surface of the outer rotatable portion.

In the down position the inner depressible button may be in-line with, or sit substantially flush with, the outer rotatable portion.

The inner depressible button may be rotatable independently of the outer rotatable portion when it is in the up position.

The inner depressible button may be attached to a spring arrangement to allow it to be maintained in the up or the down position. The inner depressible button may be configured such that applying pressure to the inner depressible button when it is in the down position may cause the inner depressible button to move, or "pop up", to (and be maintained in) the up position. The inner depressible button may be configured such that applying pressure to the inner depressible button when it is in the up position may cause the inner depressible button to move and be maintained in the down position.

The inner depressible button may be displaced a distance of between around 0.5 cm or 1 cm and 6 cm between the down and the up position. Where the inner depressible button is flush with the top of the outer rotatable portion in the down position, the top of the inner depressible button may sit this distance (of between 0.5 cm and 6 cm) above the top of the outer rotatable portion when in the up position. In some embodiments the inner depressible button may be displaced a distance of between around 0.5 cm and 5 cm between the down and the up position.

Optionally moving the inner depressible button from the down position to the up position causes the function selector to switch the pilot control input arrangement to an input function controllable by the inner depressible button.

In some embodiments switching to an input function controllable by the inner depressible button may be effected by another input, such as by the function selector.

In examples the inner depressible button is tiltable to receive user input when in the up position.

The depressible button may be tiltable or pivotable in only one direction or plane (e.g. forwards and back or side-to-side) or may be tiltable in multiple directions (e.g. both forwards and back and side-to-side, and optionally diagonally). Thus the inner depressible button may be used like an analog stick or a joystick.

The pilot control input arrangement may be configured such that the input received is dependent on the degree of tilting of the depressible button. For example, where tilting the button adjusts a numerical input number or scrolls between input options, tilting the button further from its central or resting position may increase or decrease the numerical input or scroll between options at a greater rate than tilting the button less far.

The tiltable button may be biased to return to a central, or neutral position when pressure is removed.

The pilot input arrangement may be arranged to receive inputs for a ground handling system of the aircraft when the inner depressible button is in the up position, and wherein: tilting the inner depressible button provides input to adjust one of the speed and the steering of the aircraft in ground handling mode; and rotating the inner depressible button provides input to adjust the other of the speed and the steering of the aircraft in ground handling mode.

By providing a single physical user interface element to control speed and direction of movement of the aircraft in the ground handling mode, real estate on the user interface can be reserved for the input functions used during flight, which are more numerous and complex. Ground handling is generally performed at a fairly low speed (such as being limited to not more than around 5-20 mph, preferably around 10 mph) so the inventors have found that providing a single button to control both speed and steering in this manner is sufficient. Providing a depressible button that can be used for ground handling control when in an up position and can sit flush with other user interface components when in a down position allows the button to be kept out of the way when it is not required, such as when flying.

In preferred embodiments tilting the inner depressible button fore and aft adjusts the speed and rotating the inner depressible button provides a steering input to the ground handling system. Preferably tilting the button forwards increases the forward speed and tilting the button backwards increases the speed in a backwards direction. In preferred embodiments twisting the inner depressible button effects steering control in the ground handling mode. For example, rotating the button anticlockwise may cause the aircraft to turn to the left and rotating the button clockwise may cause the aircraft to turn to the right. The speed may be dependent on the degree of tilting, for example the degree of tilting away from a neutral, or central, position. As the button is tilted further from the central position the speed increases.

Preferably the inner depressible button can be tilted and rotated at the same time. Preferably rotation of the inner depressible button can be performed independently of tilting of the inner depressible button.

In some embodiments the pilot control input arrangement has at least four different input functions selected from: a pressure setting input function for receiving a pressure setting input and communicating the pressure setting input to an altimeter; a transponder code input function for receiving a transponder code input and communicating the transponder code input to a transponder; a radio frequency input function for receiving a radio frequency input and communicating the radio frequency input to a radio; a navigation frequency input function for receiving a navigation frequency input and communicating the navigation frequency input to a navigation aid; an autopilot heading input function for receiving a heading input and communicating the heading input to an autopilot; a navigation heading input function for receiving a heading input and communicating the heading input to a navigation aid; an autopilot course input function for receiving a course input and communicating the course input to an autopilot; a navigation course input function for receiving a course input and communicating the course input to a navigation aid; an autopilot speed input function for receiving a speed input and communicating the speed input to an autopilot; an autopilot altitude input function for receiving an altitude input and communicating the altitude input to an autopilot.

The pilot input arrangement may be switchable between any combination of four or more (or all) of these input functions.

The function selector may be operable to provide a user-selectable option for each of the at least four different input functions concurrently.

The user-selectable options provided by the function selector may take the form of physical buttons, soft keys or options displayed on a touchscreen. By displaying options for at least four input functions concurrently it is easy for the user to switch or toggle between the different input functions or modes by providing a single input action (selecting the relevant option). By making the function of the display, numerical keypad interface and rotatable selector change upon user selection of one of these options, it is possible to use a single display, selector and keypad for different data input, whilst allowing the user to input the relevant data very simply within only a few input actions.

Thus user selection of one of the user-selectable options can cause the pilot control input arrangement to switch to the selected input function.

The pilot control input arrangement can be arranged to be disposed centrally in a cockpit of the light aircraft.

By providing a single input arrangement for multiple input functions that can be disposed centrally in the cockpit, a single input arrangement can be easily used by both the pilot and a co-pilot or passenger.

Preferably, particularly for dual-control aircraft, the pilot control input arrangement is integrated or fixed in a central armrest in the centre of a cockpit (the left hand armrest where the pilot's seat is on the right hand side, as is conventional in helicopters, or the right hand armrest where the pilot's seat is on the left hand side).

By centrally, we mean in-line with a longitudinal plane of the cockpit, or substantially halfway between the sides of the aircraft. For example, between two seats, the pilot's seat and a co-pilot or passenger seat.

In alternative embodiments the armrest may be disposed to one side of the cockpit, for example within a door of the aircraft. This is particularly helpful for fixed-wing aircraft and helicopters that may be flow from side-sticks.

There is also described herein: an armrest for a pilot's seat in a light aircraft, comprising the pilot input arrangement substantially as described above.

The armrest may further comprise a control handle for the aircraft, such as a collective or cyclic or throttle, preferably wherein the control handle is positioned or positionable within 15 cm of the numerical keypad interface and rotatable selector, more preferably within 10 cm or within 5 cm.

This allows the pilot to switch quickly between providing control via the control handle and inputting data on the pilot input arrangement.

The control handle can be moveable control handle is moveably mounted on the armrest for effecting control of one or more aircraft actuators, the moveable control handle being moveable between a closest position being the closest the handle is to the pilot control input arrangement and a furthest position being the furthest the handle is from the pilot control input arrangement, and wherein the pilot control input arrangement is positioned such that when the handle is in the furthest position there is not more than around 25 cm between the handle and each of the numerical keypad interface and the rotatable selector, preferably not more than around 20 cm or 15 cm.

In the closest position the moveable control handle is generally not more than around 15 cm, more preferably not more than around 12 cm or 10 cm from the pilot control input arrangement.

The moveable control handle is moveable by the pilot to effect control of the aircraft in some manner e.g. to change speed or direction of the aircraft. The moveable control handle may be a collective lever or handle in a helicopter (which may or may not have an integrated throttle control) or may be a throttle in a fixed-wing aircraft.

Preferably the armrest comprises: an elongate channel; and wherein the moveable control handle comprises: a first end slidably disposed in the elongate channel for coupling to one or more aircraft actuators; and a second end for gripping by a pilot.

Optionally, the moveable control handle is mounted in a hollow of the armrest, such that the top of the moveable control handle remains substantially level with the height of the pilot control input arrangement as it is moved.

This means the pilot can quickly switch between using the control handle and inputting data or control commands using the pilot control input arrangement.

By substantially level, we mean the height of the moveable control handle may remain within around 10 cm of the height of the pilot control input arrangement, preferably within 6 cm or within 4 cm.

The armrest can comprise an elbow support portion configured to be located backwards of the pilot control input arrangement when the armrest is installed in the aircraft.

Thus it is possible to provide a pilot input arrangement that is conveniently located when the pilot's elbow is resting on the elbow support portion. This can provide improved ergonomics and improved safety as the pilot may be able to react to conditions by providing input more quickly.

The elbow support portion may have a soft upper surface for comfort and for absorbing vibrations during flight, particularly takeoff and landing, which may improve ease of input.

Preferably the armrest further comprises an upper armrest portion positioned adjacent and slightly above the elongate channel. The upper armrest portion may have a length of at least 15 cm, preferably at least 20 cm or at least 25 cm. The upper armrest portion may be provided forward of the elbow support portion (where an elbow support portion is present). The upper armrest portion gives the pilot the freedom to slide their forearm along the armrest as they move the moveable handle. The upper armrest portion provides arm support irrespective of collective position, or whether the pilot is using the collective, a control panel or user interface portion (where present) or at rest.

There is also described herein an aircraft comprising a pilot input arrangement or armrest substantially as described above.

There is also described herein a pilot input arrangement for a light aircraft, the pilot control input arrangement positionable in an armrest for a pilot's seat, the pilot control input arrangement comprising: a numerical keypad interface for inputting data; a rotatable selector for inputting data; a function selector operable to switch the pilot input arrangement between being operable to receive inputs from at least two different categories of input, the at least two different categories of input being selected from the following: a pressure setting for an altimeter; a transponder code for a transponder; frequencies for radio or navigation equipment; course or headings for an autopilot or navigation equipment; an interfacing arrangement for communicating inputs to at least two aircraft systems selected from: an altimeter; a transponder; a radio; a navigation system; and an autopilot system.

There is also described herein a method for receiving pilot control input for a light aircraft via a pilot input arrangement having a numerical keypad interface and a rotatable selector and an interfacing arrangement communicably coupled to at least two aircraft systems selected from: an altimeter; a transponder; a radio; a navigation system; and an autopilot system; the method comprising: providing user-selectable options for at least two input functions of the pilot control input arrangement, wherein the at least two different input functions are selected from: a pressure setting input function for receiving a pressure setting input and communicating the pressure setting input to an altimeter; a transponder code input function for receiving a transponder code input and communicating the transponder code input to a transponder; a radio frequency input function for receiving a radio frequency input and communicating the radio frequency input to a radio; a navigation frequency input function for receiving a navigation frequency input and communicating the navigation frequency input to a navigation aid; an autopilot heading input function for receiving a heading input and communicating the heading input to an autopilot; a navigation heading input function for receiving a heading input and communicating the heading input to a navigation aid; an autopilot course input function for receiving a course input and communicating the course input to an autopilot; a navigation course input function for receiving a course input and communicating the course input to a navigation aid; receiving a user selection of one of the user-selectable options; switching the pilot input arrangement to operate according to the selected input function; receiving a user input via the numerical keypad interface or the rotatable selector; and communicating the user input to the relevant aircraft system via the interfacing arrangement.

The method may further comprise: displaying a value corresponding to the received user input on a display of the pilot input arrangement or a display communicably coupled to the pilot input arrangement; receiving a user confirmation of the displayed value; and upon receiving the user confirmation, communicating the user input to the relevant aircraft system.

The confirmation may be received via the numerical keypad interface or the rotatable selector, preferably regardless of which was used to input the value.

Optionally, the method further comprises: receiving a user input to adjust the value corresponding to the user input via the rotatable selector; and displaying the adjusted value on the display of the pilot input arrangement or the display communicably coupled to the pilot input arrangement; and wherein receiving a user confirmation of the displayed value comprises receiving a user confirmation of the adjusted value; and wherein communicating the user input to the relevant aircraft systems comprises communicating the adjusted user input to the relevant aircraft system.

Providing user-selectable options for at least two input functions of the pilot control input arrangement, comprises providing user-selectable options for at least two of the following aircraft systems: an altimeter; a transponder; a radio; a navigation system; and an autopilot system; and upon the user selecting an option corresponding to a radio, a navigation system, or an autopilot system: providing user selectable options corresponding for an input function corresponding to inputs for the selected one or the radio, the navigation system or the autopilot system.

There is also described herein a computer-readable medium comprising instructions which, when executed by a computer, cause the computer to carry out the method substantially as described above.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE FIGURES

Systems and methods for aircraft control are described by way of example only, in relation to the Figures, wherein.

DETAILED DESCRIPTION

Aircraft

Figure 1:
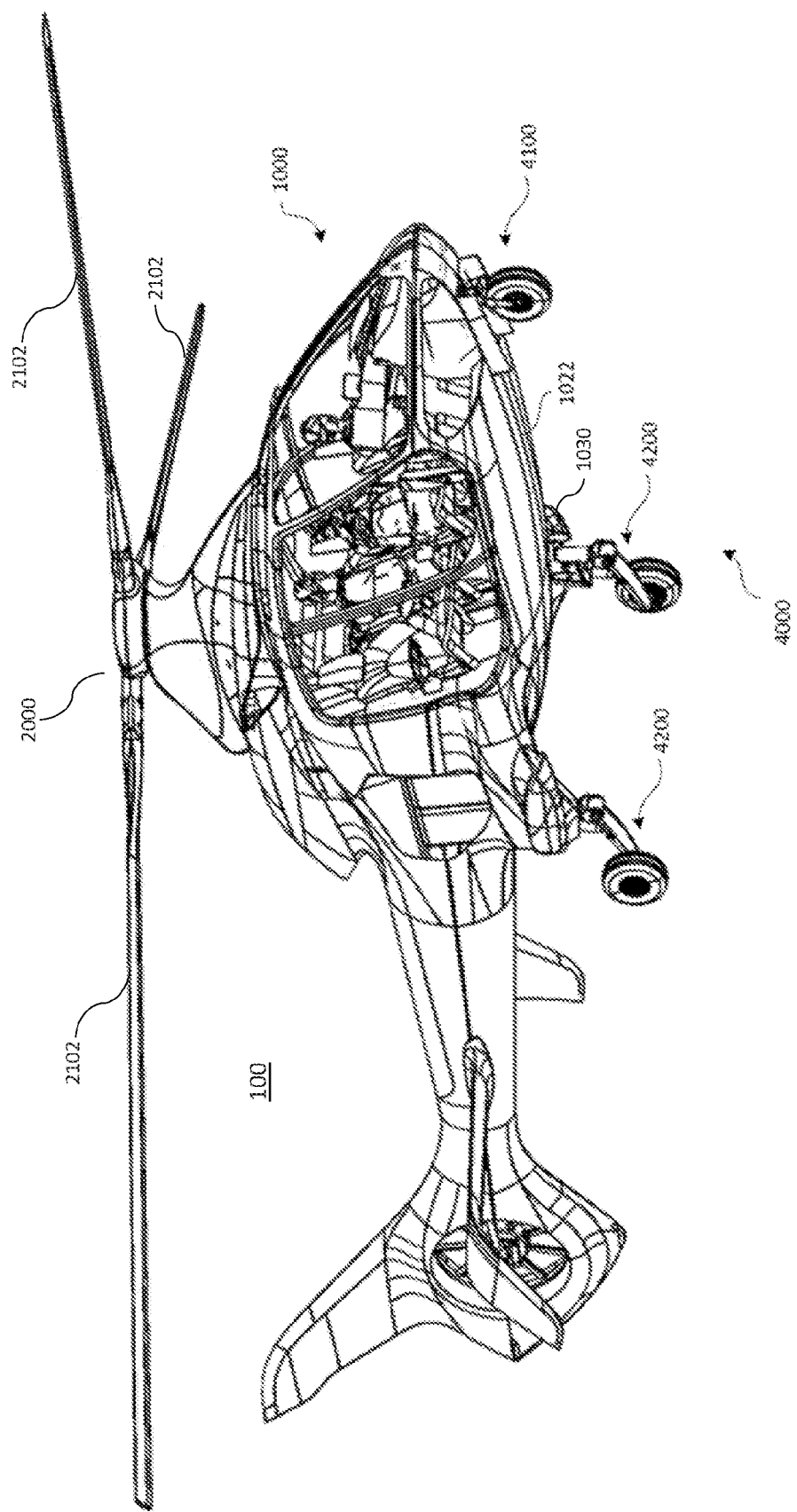
FIG. 1 shows a perspective view of an aircraft, in this case a helicopter.

FIG. 1 shows a helicopter 100 having a fuselage 1000, a main rotor assembly 2000 and a landing gear arrangement 4000. The main rotor assembly 2000 is fixed to the top of the fuselage and comprises main rotor blades 2102. The helicopter 1000 in this example has three main rotor blades 2102.

Towards the rear and bottom and on each of the left and right sides of the fuselage 1000, is a wheel fairing 1030. The wheel fairings 1030 project generally outwardly and downwardly from the rear of the fuselage 1000 and provide lateral stability for the helicopter 100 when in forward flight.

The landing gear arrangement 4000 is retractable into the bottom 1022 of the fuselage 1000 and comprises at least one nose wheel assembly 4100 and a plurality of main wheel assemblies 4200, in this case two main wheel assemblies 4200. The landing gear arrangement 4000 has a stowed configuration and a deployed configuration, and is arranged to move between the configurations in response to receiving a landing gear control input. The wheel assemblies are provided with motors to allow them to be rotated as part of a ground movement system for the helicopter 100 when the helicopter is positioned on the ground.

The helicopter 100 has various instruments within the cockpit, including an altimeter, a radio, a transponder, an autopilot and a navigation aid.

Pilot Input System

Figure 2:
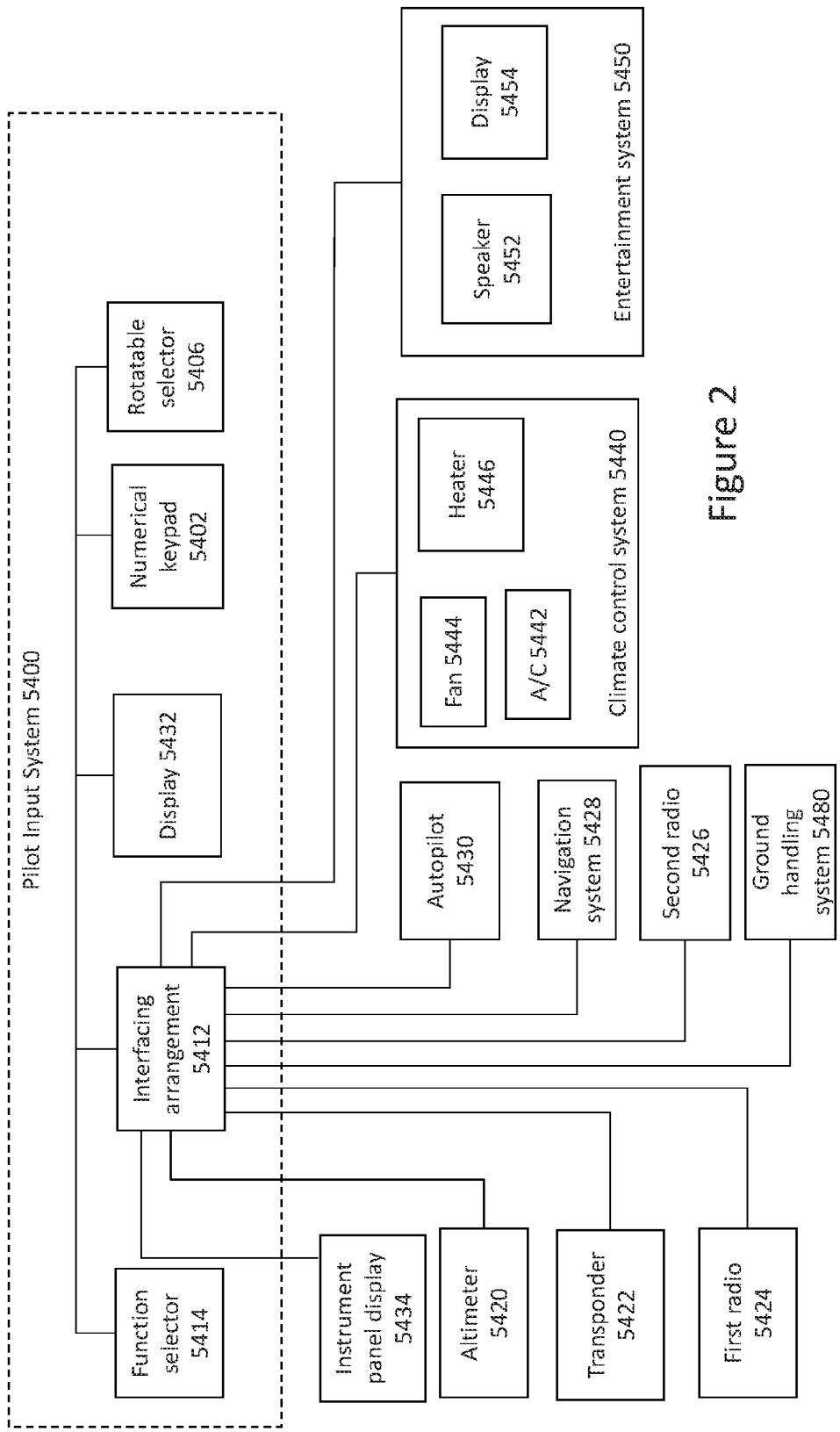
FIG. 2 shows a block diagram of a pilot input system.

FIG. 2 shows a block diagram of a pilot input system 5400. The pilot input system 5400 may be used in the aircraft of FIG. 1. FIG. 2 also shows aircraft systems which are communicably coupled to the pilot input system 5400. Although in some embodiments not all of these aircraft systems would be present in the aircraft and/or only some of these aircraft systems would be in communication with the pilot input system 5400.

The pilot input system 5400 includes a numerical keypad 5402, through which a user can input data, by typing the data into the keypad. The numerical keypad 5402 has number keys to allow numerical data to be input, this is particularly useful in aircraft as many of the avionics require numerical input such as frequency, heading or speed inputs. One or more additional keys, such as a select/enter, delete/clear and/or cancel key may also be provided on the keypad 5402. In some embodiments up/down keys, which may be used for increasing or decreasing numbers or scrolling between options, and/or left/right keys, which may be used for scrolling between digits in a single number or scrolling between options, may also be provided on the numerical keypad 5402. One or more dedicated keys for typing in letters may also be provided, or alternatively the number keys may be mapped to one or more letters, such as in telephone-style keypads (e.g. using standard ITU E.161). Generally it is not desirable to provide a full alphabetical (e.g. QWERTY) keypad in the pilot input system 5400 as this would take up a large amount of space.

The numerical keypad 5402 has permanent physical keys or buttons. Physical buttons are useful because it is easier to feel these and so enter data without looking at the keypad. It may also be easier to ensure the correct button is pressed in bumpy conditions, such as in turbulence or bad weather.

The pilot input system 5400 also comprises a rotatable selector 5406 for inputting data. The rotatable selector 5406 can be rotated to scroll between selectable options or to increase or decrease a numerical value being input. In this case the rotatable selector 5406 is depressible and depressing the rotatable selector 5406 provides a "select" or "confirm" command to confirm the input of the provided data or selected option.

The pilot input system 5400 is operable to receive user input data via both the numerical keypad 5402 and the rotatable selector 5406. Either may be used to input the same piece of data, thus giving the pilot/user a choice of their preferred method. Preferably both may be used to make a single data input. For example a number may be typed in using the numerical keypad 5402 and that number may be adjusted using the function selector 5406, e.g. to "jog" or increase or decrease the input data. This may provide a quicker or simpler input method. The input data may be sent to the relevant aircraft system as it is entered, or the pilot input system 5400 may be configured to wait for a user confirmation of the input data before sending it to the relevant aircraft system.

The pilot input system 5400 in this case also comprises a display 5432. The display is a touchscreen and is operable to display user-selectable buttons or options. The display 5432 is also operable to display data input by a user. For example, it may display a number entered on the keypad 5402 or may display a user-selectable option based on scrolling using arrow keys on the keypad 5402 or rotation of the rotatable selector 5406. The display 5432 may highlight a selected option in a plurality of displayed user-selectable options. The display may also provide a visual indication of what input function or mode the pilot input system 5400 is currently operating in.

However in some embodiments data input by a user may alternatively or additionally be displayed on a screen or display of the relevant aircraft system (e.g. altimeter, transponder or radio). This is particularly useful if the pilot input system does not comprise a dedicated display 5432.

The pilot input system 5400 comprises an interfacing arrangement 5412 for enabling communication with avionics and other systems in the aircraft. The interfacing arrangement 5412 provides a wired interface with a number of aircraft systems for achieving this communication.

The pilot input system 5400 also comprises a function selector 5414 for switching between different input functions, or modes, of the pilot input system 5400. In preferred embodiments the pilot input system 5400 only a single type of input can be input into the pilot input system 5400 at any one time. This reduces the complexity of the system and makes it easier to use for a pilot, who may also be flying the aircraft at the same time as inputting data.

The interfacing arrangement 5412 is communicably connected to an altimeter 5420 (in this case via a wired connection), which measures altitude of the aircraft. It is generally necessary to input pressure settings into altimeters to enable them to provide correct readings. The pilot input system 5400 is thus operable to receive a user-input pressure setting via both the numerical keypad 5402 and the rotatable selector 5406. The interfacing arrangement 5412 is thus operable to communicate the pressure setting input by the user to the altimeter 5420.

The interfacing arrangement 5412 is also communicably connected to an transponder 5422 (in this case via a wired connection), which provides a response to radio-frequency interrogation to aid air traffic control. Transponder codes (generally 4-digit number codes, also known as "squawk codes") must be set in the transponder to allow the aircraft to be identified by air traffic controllers. The pilot input system 5400 is thus operable to receive a user-input transponder code via both the numerical keypad 5402 and the rotatable selector 5406. The interfacing arrangement 5412 is operable to communicate the transponder code input by the user to the transponder 5422.

The interfacing arrangement 5412 is also communicably connected to each of a first radio 5424 and a second radio 5426 (in this case via a wired connection). The radios 5424, 5426 allow two-way voice communication between the pilot and air traffic controllers and/or other aircraft. Radio frequencies are input to each of the radios to change the frequency of communication. A current and a standby frequency may be set for each radio. The pilot input system 5400 is operable to receive a user-input frequency via both the numerical keypad 5402 and the rotatable selector 5406. The interfacing arrangement 5412 is operable to communicate the frequency input by the user to either of the radios 5424, 5426.

The pilot input system 5400 may have different input functions for receiving and communicating radio frequencies for each radio, for example one input function for each type of frequency for each radio. Alternatively there may be a single input function for receiving and communicating radio frequencies and the user may be required to input a which radio and/or which type of frequency (e.g. current or standby) is being input. The radio and/or the type of frequency may be selected from a list of options displayed to the user.

The interfacing arrangement 5412 is also communicably connected to a navigation aid 5428 (or navigation system) via wires. The navigation system 5428 may allow or require any or all of a frequency input, a heading input and a course input to be entered. The pilot input system 5400 is operable to receive a frequency input, a heading input and a course input via both the numerical keypad 5402 and the rotatable selector 5406. The interfacing arrangement 5412 is operable to communicate the frequency input, heading input or course input to the navigation aid 5428. The pilot input system 5400 has different input functions for receiving each of the frequency, heading and course inputs for the navigation system 5428.

The interfacing arrangement 5412 is also communicably coupled to an autopilot 5430 (in this case via a wired connection), which can control the trajectory of the aircraft without requiring continuous pilot control. The autopilot may allow or require any or all of a heading, course and airspeed to be entered. The pilot input system 5400 is operable to receive a heading input, a course input and an airspeed input via both the numerical keypad 5402 and the rotatable selector 5406. The interfacing arrangement 5412 is operable to communicate the heading, course or airspeed inputs to the autopilot 5430. The pilot input system 5400 has different input functions for receiving each of the heading, course and airspeed inputs for the autopilot 5430.

The interfacing arrangement 5412 is also communicably coupled (in this case via a wired connection) to a display 5434 on the instrument panel of the aircraft, which is located at the front of the cockpit in front of the pilot's seat. The interfacing arrangement 5412 can send user inputs and/or other information to the instrument panel display 5434 for display. For example, data (such as headings, frequencies, pressure settings) input by the user may be sent to the display 5434 and displayed to a user as it is entered so the user can check it before confirming the input, after which the input can be sent to the relevant aircraft system. The current operating mode, or currently running input function, of the pilot input system 5400 may also be sent to the display 5434 and displayed to a user on the display 5434. This is particularly useful where the display 5432 is not provided in the pilot input system 5400, but both may be provided to give the pilot an option to look at a display next to the input system input features (keypad and rotatable selector) or to look at a display on or near the instrument panel.

The interfacing arrangement 5412 is also communicably coupled (in this case via a wired connection) to a climate control system 5440, which can provide climate control for the cockpit of the aircraft. The climate control system 5440 in this case comprises a fan 5444, an air conditioning system 5442 and a heater 5446. The pilot input system 5400 is operable to receive climate control settings for the climate control system 5440 via one or both of the numerical keypad 5402 and the rotatable selector 5406. The interfacing arrangement 5412 is operable to communicate the climate control settings to the climate control system 5440. The pilot input system 5400 has different input functions for receiving climate control settings for each of the fan 5444, an air conditioning system 5442 and a heater 5446.

The interfacing arrangement 5412 is also communicably coupled (in this case via a wired connection) to an entertainment system 5450, which can provide entertainment such as video and/or audio entertainment via a speaker system 5452 and a display 5454. The pilot input system 5400 is operable to receive settings for the entertainment system 5450 via one or both of the numerical keypad 5402 and the rotatable selector 5406. The interfacing arrangement 5412 is operable to communicate the entertainment settings to the entertainment system 5450. The entertainment system 5450 may also send a list of options for entertainment to the pilot input system 5400, for example music or film choices, which can be displayed to a user via the pilot input system display 5432 or instrument panel display 5434. A user can select an entertainment option (or media option) using the numerical keypad 5402 and/or rotatable selector 5406 and the interfacing arrangement 5412 can send this selection back to the entertainment system 5450. Settings for the entertainment system 5450 may also include volume for the speaker system 5452 and screen brightness and/or contrast for the display 5454. User inputs for such settings can be received by the pilot input system 5400 via the numerical keypad 5402 and/or rotatable selector 5406 and communicated to the entertainment system 5450 via the interfacing arrangement 5412. The pilot input system 5400 may have a different input function for each of the entertainment system settings and another input function for selection of entertainment (or media) options.

The function selector 5414 is operable to switch the pilot input system 5400 between different input functions. In each input function the pilot input system 5400 is operable to receive a particular user input for a particular aircraft system. For example, there are different input functions for receiving a frequency input for the navigation system 5428 and for receiving a transponder code for the transponder 5422. The function selector 5414 is also operable to switch the pilot input system 5400 between different input functions for receiving a heading for the autopilot 5430 and for receiving a heading for the navigation system 5428.

The function selector 5414 is operable to switch the pilot input system 5400 between the different input functions upon receiving a user selection of the desired input function at the pilot input system 5400. For example, this may be via a permanent button or softkey of the pilot input system 5400 (e.g., on the numeric keypad 5402), or a selection from a list of input functions via the rotatable selector 5406.

As can be seen from the above description, the pilot input system 5400 is operable to receive different categories of input (e.g. frequency, speed or pressure values) and to send them to different aircraft devices (radio, transponder, climate control system etc). Some categories of input (e.g. frequency or heading) may be used for several of the aircraft systems (e.g. both navigation system and autopilot have heading inputs). The pilot input system 5400 has different input functions for receiving and communicating an input of a particular category to different aircraft systems.

Below is an illustrative, but non-exhaustive, list of input categories and corresponding input functions.

| Example Input Categories | Example Input Functions |
|---|---|
| Frequency input | Frequency input for radio 1 |
| | Frequency input for radio 2 |
| | Frequency input for navigation system |
| Speed input | Speed input for autopilot |
| | Speed input for ground movement system |
| Altitude input | Altitude input for autopilot |
| Pressure input | Pressure input for altimeter |
| Heading input | Heading input for autopilot |
| | Heading input for navigation system |
| Course input | Course input for autopilot |
| | Course input for navigation system |
| Transponder Function Control (IDENT/MODE) input | Transponder Function Control (IDENT/MODE) input for transponder |
| Transponder Code input | Transponder Code input for transponder |
| Steering input | Steering input for ground movement system |
| Temperature input | Temperature input for climate control system |
| Vent selection input | Vent selection for climate control system |
| Fan speed override input | Fan speed input for climate control system |

Although the keypad 5402 is a permanent physical numerical keypad, in alternative embodiments the keypad could be provided in the form of programmable soft keys or a buttons displayed on a touchscreen. Where touchscreen buttons are provided, these may be displayed on all part of the display 5432 of pilot input system 5400.

Although in this embodiment a display 5432 is provided, this is an optional feature. By not providing a display in the pilot input system 5400, the size of the pilot input system 5400 can be reduced. In addition, it may be helpful to discourage pilots from looking down at their hands as they input data and preferred to display inputs on a separate screen, preferably in front of the pilot so it is in their line of vision when looking out to the front of the aircraft, such as instrument panel display 5432.

Although two radios 5424, 5426 are shown, in some embodiments only a single radio is provided in an aircraft, particularly for smaller aircraft.

Although wired connections are shown between the interfacing arrangement 5412 and the aircraft systems, in some embodiments an interfacing arrangement with wireless capabilities may be provided to allow communication with some or all of the aircraft systems. For example, short-range wireless communication protocols such as WiFi, Bluetooth or Zigbee may be used, although other RF communications are envisaged.

Input Method

Figure 3:
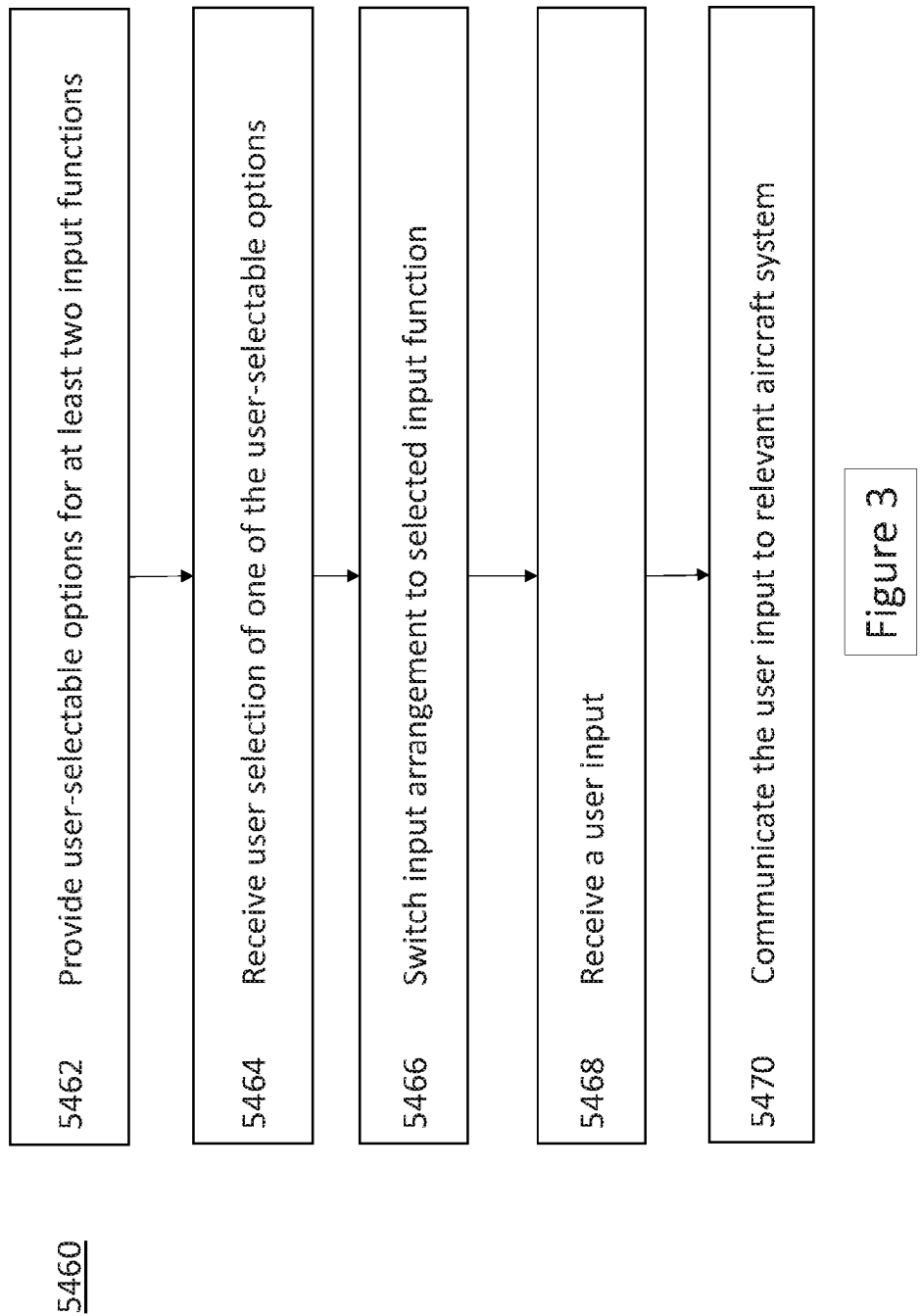
FIG. 3 shows a method for receiving pilot inputs.

FIG. 3 shows a method 5460 for receiving pilot inputs via a pilot input arrangement, such as the pilot input system 5400 shown in FIG. 2.

At step 5462 user-selectable options for at least two input functions of the pilot input arrangement can be provided. These may be displayed to a user, for example on the pilot input system display 5432 and/or on the instrument panel display 5434. In some embodiments options are displayed on a touchscreen display of the pilot input arrangement (e.g. display 5432) to allow user selection by pressing the portion of the touchscreen on which the option is displayed). Alternatively or additionally, one or more input function options may be provided on permanent physical buttons of the pilot input system (e.g. on the numerical keypad 5402). In some embodiments options may be provided on a portion of the display 5432 that corresponds to programmable buttons or soft keys, allowing a user to select an option by depressing the corresponding programmable button or soft key.

In some embodiments step 5462 comprises providing selectable options for two or more aircraft devices. Where the selected aircraft device can only receive one type of input, this may cause the pilot input arrangement to switch to the relevant input function so it can receive the user input and send it to the aircraft device. However upon the user selecting an aircraft device option that can receive more than one category of input (e.g. autopilot 5430), step 5462 may further comprise displaying two or more options for inputs for the aircraft device.

In other embodiments step 5462 comprises providing options for multiple different input functions for a single aircraft device (multiple input functions may relate to inputs in the same category and/or in different categories), as well as one or more options for input functions for other aircraft devices. For example, options for setting an input for an altitude input for the autopilot, a pressure input for an altimeter, a heading input for the autopilot and a heading input for a navigation system may all be displayed concurrently.

Step 5464 comprises receiving a user selection of one of the provided options. For example, this may be through pressing a physical button (permanent or programmable), selecting by touching an option displayed on a touchscreen. In some embodiments a user can scroll through displayed options (e.g. using arrow keys on the keypad 5402 or rotating the rotatable selector 5406. The user can select the desire option by depressing the rotatable selector 5406 or by pressing a "confirm" or "enter" button on the keypad 5402.

At step 5466 the pilot input arrangement is switched to the input function selected by the user in step 5464. This makes the pilot input arrangement operable to receive user input of the type of input (e.g. frequency, transponder code etc) required for the input function and to communicate the input to the relevant aircraft device. In some embodiments a current value already stored or used by the aircraft device can be shown as a starting point for the user to alter, e.g. a current temperature setting for the climate control system or a current radio frequency.

At step 5468 a user input is received. The user input may be entered by the user on the numerical keypad or the rotatable selector. Preferably the pilot input arrangement is configured such that both the numerical keypad and the rotatable selector are operable to receive the user input. The user may enter an input by typing a number on the keypad. The user may then be able to adjust that number using the rotatable selector. The user may confirm the user input, e.g. by depressing a confirm button or depressing the rotatable selector.

When a user input is received it may be displayed to the user. This may be on a display of the user input arrangement, or on a separate display, such as a display on or near the instrument panel. In some embodiments the user input is displayed on a display of the relevant aircraft device (e.g. on a screen of the radio or altimeter etc.).

At step 5470 the user input is communicated to the relevant aircraft system. The relevant aircraft system is the system specified by the selected input function in step 5464. The user input is communicated to the relevant aircraft system via the interfacing arrangement (e.g. interfacing arrangement 5412) by wired or wireless communication. If confirmation is required in step 5468, in some embodiments the user input is not communicated to the aircraft device until confirmation of the user input is received.

Aircraft Cockpit

Figure 4:
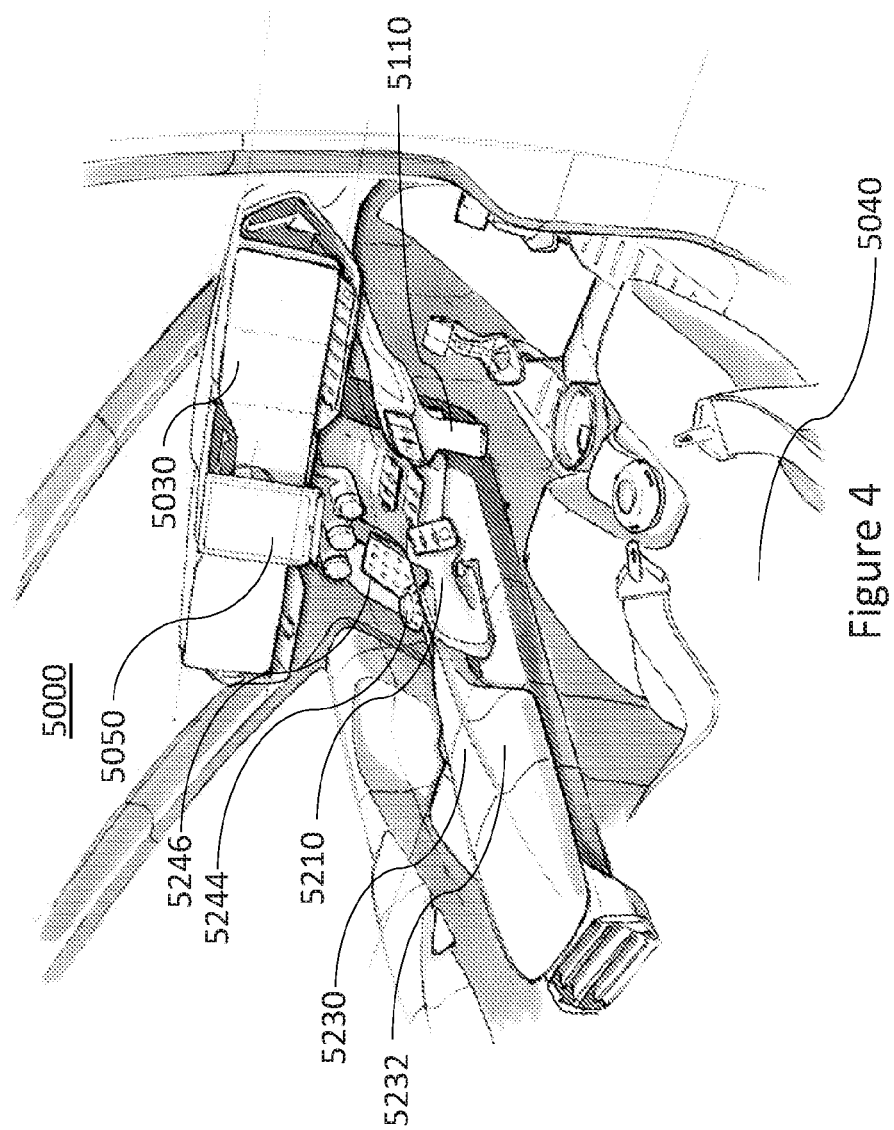
FIG. 4 shows an example of an aircraft cockpit having a user interface system that may be used in the aircraft of FIG. 1.

FIG. 4 shows an example of an aircraft cockpit having a user interface system that may be used in the aircraft of FIG. 1.

The cockpit has a pilot control arrangement 5000 for allowing pilot control of the helicopter 100.

The cockpit comprises a pilot's seat 5040 on the right hand side of the cockpit, as is conventional in helicopters. Above the pilot's seat 5040 and slightly in front of the seatback is a cyclic control handle 5110. In front of the pilot's seat is an instrument panel 5030, which may hold instrument displays such as altimeters, radios, speed gauges and the like, which are required in helicopters.

Mounted towards the centre of the cockpit and in line with the instrument panel 5030 is a tablet computer 5050, such as an iPad. The tablet computer 5050 is communicably coupled to control systems in the helicopter, either via a detachable wired connection, or via a wireless connection, such as WiFi, Zigbee or Bluetooth. The tablet computer 5050 may be loaded with specialist applications for navigation and controlling the helicopter 100. As such, the tablet computer 5050 can be used as the second user interface 5532, described above in relation to FIG. 4. Speed and direction controls for the helicopter movement system can be input via touchscreen buttons displayed on the screen of the tablet. Images from cameras on the helicopter and proximity data from position sensors can be displayed on the tablet to aid control of the helicopter movement system.

To the left of the pilot's seat 5040 is an armrest 5230. The armrest 5230 is located on top of a central cockpit divider 5234, which extends down the centre of the cockpit in a forward/back direction (longitudinal), from the instrument panel 5030 to the seatback of the pilot's seat 5040. The central cockpit divider 5234 divides the left side of the cockpit from the right side. As is conventional, the pilot's seat 5040 is shown on the right of the cockpit and there is a seat for a co-pilot or passenger on the left of the cockpit (not shown).

At the back of the armrest 5230 is an elbow support 5232. The elbow support 5232 comprises a generally horizontal surface located at a height to support the pilot's elbow when seated in the pilot's seat 5040. In this example the elbow support portion 5232 is located towards the right hand side of the armrest 5230 and is slightly lower than a horizontal surface on the left of the armrest 5230, which is for a passenger or co-pilot to rest their arm on.

Forward of the elbow support 5232 is a collective handle 5210 supported in an elongate channel 5212 such that it is grippable by the pilot. A user interface portion 5240 of the armrest 5230 is located on the left of the armrest, level with the collective handle 5210. The user interface portion 5240 may be used as a pilot input arrangement as described above in relation to FIGS. 2 and 3.

The user interface portion 5240 of the armrest 5230 comprises user input features, such as numerical keypads, buttons, rotatable knobs and/or rotatable puck selectors, with which the pilot can input certain controls, such as radio control. Locating this arrangement on the armrest allows the pilot to easily switch between inputting commands on the user interface and adjusting the collective pitch of the helicopter blades.

At the left side of the user interface portion 5240 is a rotatable puck selector 5244. Directly in front of the puck selector 5244 is a keypad 5246 comprising twelve buttons. These user interface components can be used to input and select options. As the user interface portion 5240 is integrated into the armrest of the cockpit, communication to helicopter control systems is via a wired connection. The puck selector 5244 may be provided as the rotatable selector 5406 in the pilot input arrangement described above and the keypad 5246 may be used as the numerical keypad 5402 described above.

The puck selector 5244 can be used as a user interface element for the helicopter movement system. Speed and direction controls for the helicopter movement system can be input via the puck selector 5244, as described in more detail below. For example, in one embodiment twisting or rotating the puck selector 5244 provides steering input to the helicopter movement system and tilting the puck selector 5244 in a forwards direction increases forward speed of the helicopter, whilst tilting the puck selector 5244 in the backwards/aft direction increases backwards speed of the helicopter. Images from cameras on the helicopter and proximity data from position sensors can be displayed on the instrument panel 5030 (particularly when the tablet 5050 is not present) to aid control of the helicopter movement system.

Figure 5:
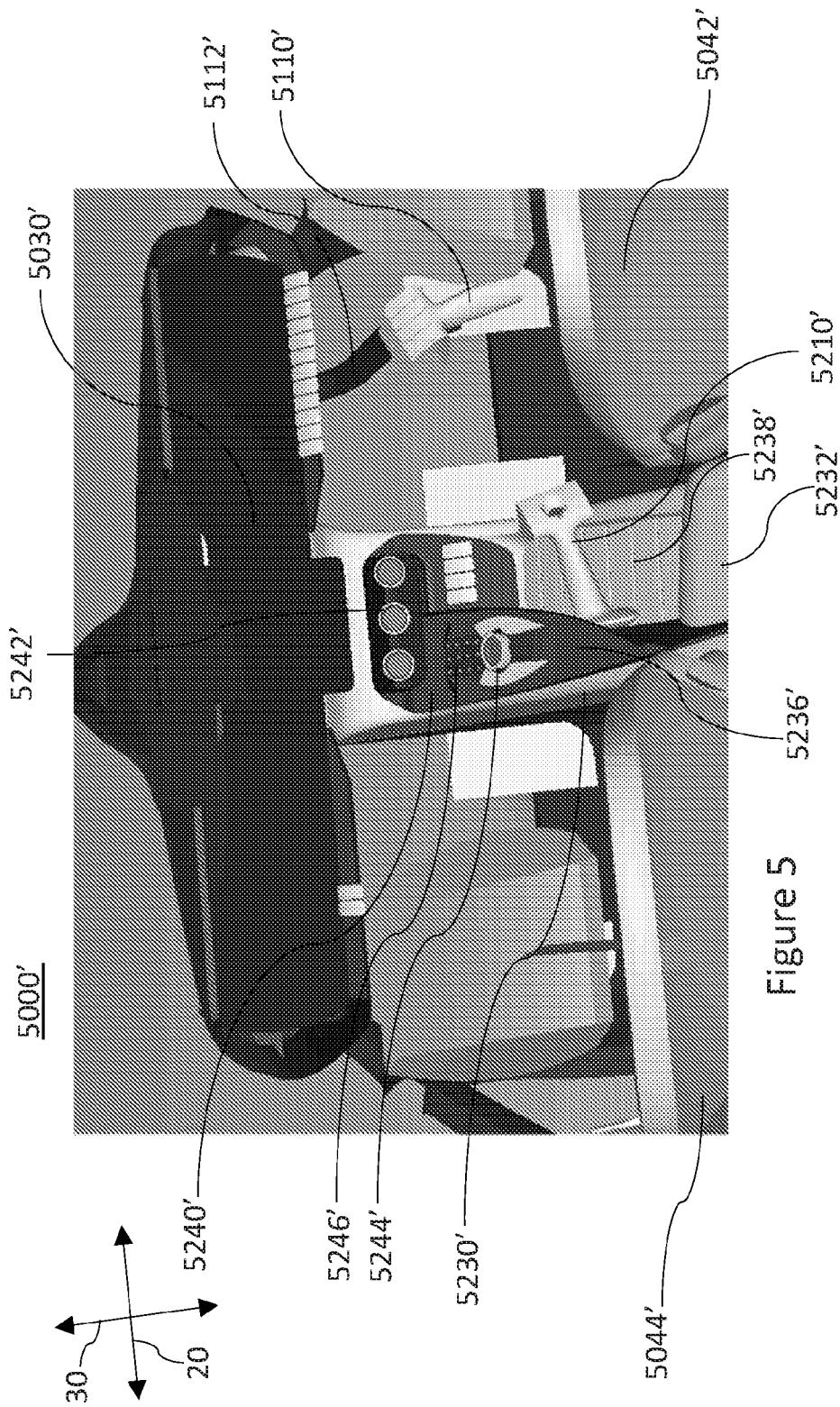
FIG. 5 shows another example of an aircraft cockpit having a user interface system that may be used in the aircraft of FIG. 1.

FIG. 5 shows another example of an aircraft cockpit having a user interface system that may be used in the aircraft of FIG. 1. The aircraft cockpit is provided with a pilot control arrangement 5000', similar to the one shown in FIG. 4, installed in an aircraft cabin, for example the cabin of helicopter 100. Features labelled in FIG. 5 by numerals with an additional' afterwards correspond to the features with the same reference numeral shown in FIG. 4. The corresponding features work in substantially the same manner as those shown in FIG. 4 unless otherwise stated.

A pilot's seat is located on the right hand side of the cabin, backward of an instrument panel 5030'. The pilot's seat has a seatback 5042' at the back of the seat. A second seat 5044', for a co-pilot or passenger is located adjacent the pilot's seat, on the left hand side of the cabin. Between the pilot's seat and the second seat 5044' there is a central cockpit divider 5234'. The cockpit divider 5234' is in line with the centre line (from front to back) of the cockpit (direction shown by arrow 30). As can be seen, the central cockpit divider 5234' extends from a level behind the pilot's seat and the co-pilot's seat 5044' to forward of the instrument panel 5030'. The width of the central cockpit divider 5234' is about 40 cm. In some embodiments it may be smaller, such as less than around 35 cm or less than around 25 cm.

A cyclic handle 5110' is positioned above the pilot's seat and in front of the seatback 5042'.

An elongate connector 5112' extends forwards from the cyclic handle 5110' and passes under the instrument panel 5030'. The cyclic handle 5110' extends down from the elongate connector 5112' and can be gripped by the pilot, when seated.

On top of the central cockpit divider 5234' is an armrest 5230'. The armrest 5232' comprises an elbow support 5232' towards the back. The armrest 5232' is a generally horizontal surface level with the seatback 5042' of the pilot's seat. The elbow support 5232' is around 30 cm wide (transverse distance across the helicopter) and around 30 cm in length. The elbow support 5232' is around 20 cm above the height of the seat part of the pilot's seat, to enable the pilot to place their elbow on the elbow support 5232' comfortably when seated.

Forward of the elbow support 5232' the armrest 5230' comprises an upper armrest portion 5236' and an armrest recess 5238'. The upper armrest portion 5236' and the armrest recess 5238' are adjacent to one another, with the upper armrest portion 5236' on the left side of the armrest 5230' and the armrest recess 5238' on the right side of the armrest 5230'. The upper armrest portion 5236' comprises a substantially horizontal surface that continues at roughly the same height/level as the elbow support 5232'. The armrest recess 5238' comprises a substantially horizontal surface below the height/level of the elbow support 5232' and the upper armrest portion 5236'. In this example the horizontal surface of the armrest recess 5238' is around 10 cm below the elbow support 5232'.

The upper armrest portion 5236' and the armrest recess 5238' extend forwards from the elbow support 5232' to a user interface portion 5240' of the armrest 5230'. Directly in front of the user interface portion 5240' is the instrument panel 5030'.

Between the elbow support 5232' and the armrest recess 5238' is a substantially vertical surface extending forwards from the elbow support 5232'. In that substantially vertical surface an elongate channel 5212' is formed. The elongate channel 5212' is in a forward/backward direction.

A collective handle 5210' is slidably secured in the elongate channel 5212'. A grippable end of the collective handle 5210' extends from the elongate channel 5212'. The grippable end of the collective handle 5210' extends in a substantially horizontal direction, in this case to the right, such that it is located in the armrest recess 5238'. The collective handle 5210' can be gripped by the pilot's left hand and moved back and forth along the elongate channel 5212'. The length of the elongate channel 5212' is around 30 cm. As can be seen, the elongate channel 5212' is slightly curved, so that it is higher in the centre than at the ends. The top of the grippable portion of the collective handle 5210' is roughly level with the horizontal surface of the upper armrest portion 5236'. The pilot can easily operate the collective handle 5210' while resting their elbow on the elbow support 5232'. When not required to operate the collective handle 5210', the pilot may rest their forearm on the upper armrest portion 5236'. However even whilst using the collective 5210' the pilot can position their forearm on the upper armrest portion 5236' and seamlessly slide their forearm along the upper armrest portion 5236' as they move the collective 5210'. This provides arm support irrespective of collective position, or whether the pilot is using the collective, the control panel or at rest.

The user interface portion 5240' of the armrest 5230' comprises user input features, such as numerical keypads, buttons, rotatable knobs and/or rotatable puck selectors, with which the pilot can input certain controls, such as radio control. The user interface portion 5240' of the armrest 5230' is around the same height as the upper armrest portion 5236'. This arrangement allows the pilot to easily switch between inputting commands on the user interface and adjusting the collective pitch of the helicopter blades. The user interface portion 5240' may be used as the pilot input arrangement 5400 described above in relation to FIGS. 2 and 3.

The elbow support 5232', upper armrest portion 5236', armrest recess 5238' and user interface portion 5240' may be formed separately, or formed together as an integrated armrest 5230', or may be formed in one or more integrated combinations. In a preferred embodiment the upper armrest portion 5236' and user interface portion 5240' are formed as a single piece and the elbow support 5232' and armrest recess 5238' are formed as a separate single piece. This aids assembly.

As can be seen, there are three raised forward buttons 5242' at the front end of the user interface portion 5240'. At the left side of the user interface portion 5240' is a rotatable puck selector 5244'. Directly in front of the puck selector 5244' is a keypad 5246' comprising twelve buttons. These user interface components can be used to input and select options. It may be used in conjunction with displays on the control panel 5030'. The puck selector 5244' can be used as the rotatable selector 5406 and the keypad 5246' as the numerical keypad 5402 of the pilot input system 5400 described above.

The dimensions of the visible area of the user interface portion 5240' is around 20 cm long by around 10 cm wide along most of its length. As can be seen the part of the user interface portion 5240' that has the forward button 5242' is a little wider, about 15 cm in width. The visible area of the user interface portion 5240' is around 225 cm$^2$.

The proximity of the upper armrest portion 5236', the user interface portion 5240' and the collective handle 5210' makes it very easy for the pilot to switch between controlling the collective and programming other aircraft controls, whilst keeping their arm in a comfortable position.

User Interface

Figure 6:
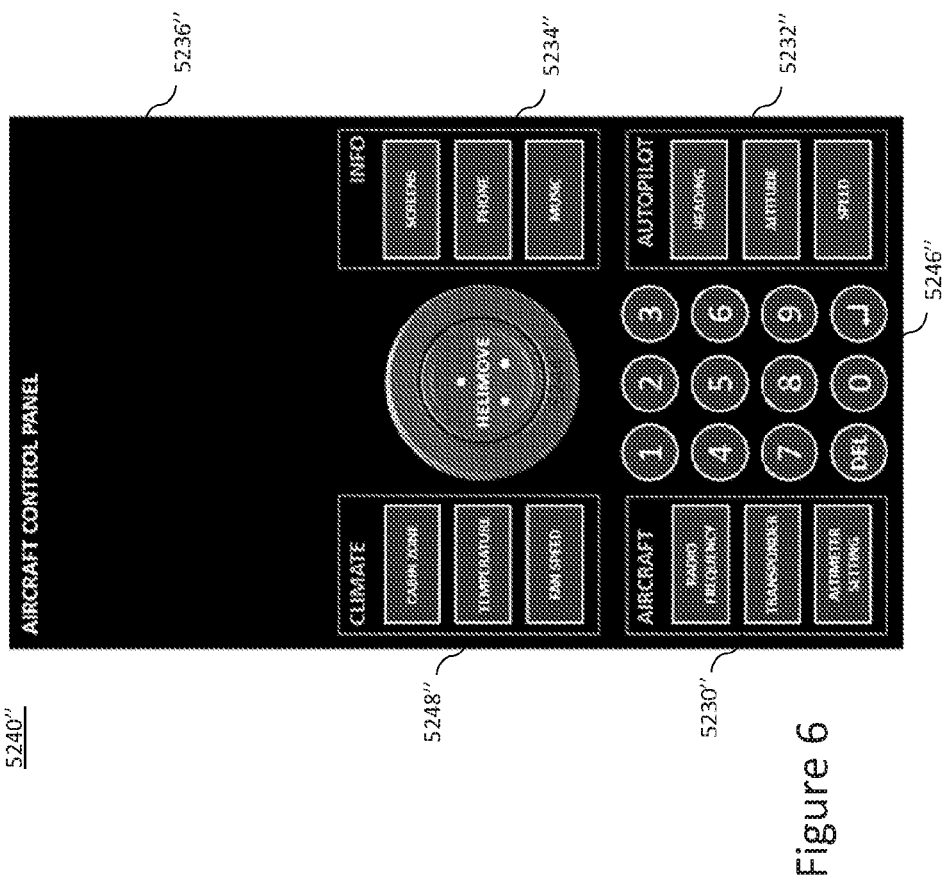
FIG. 6 shows a user interface suitable for the aircraft of FIG. 1.

FIG. 6 shows a user interface portion 5240" suitable for the pilot input arrangement 5400 described above, and may be used in the cockpits shown in FIGS. 4 and 5.

The user interface portion 5240" has a numerical keypad 5246", which may be used as the numerical keypad 5402 of the pilot input system 5400 described above. The numerical keypad 5246" has 12 buttons, including 10 number keys, a delete key and an enter key.

The user interface portion 5240" also has a rotatable puck selector 5244". The puck selector 5244" can be used as the rotatable selector 5406 of the pilot input system 5400 described above. The rotatable puck selector 5244" can be used by rotating to scroll between selectable options and adjust input values. The rotatable puck selector 5244" can also be depressed to confirm a selection of an option. Thus the user is provided with a choice for input entry, either using the numeric keypad 5246" or the rotatable puck selector 5244".

Apart from the puck selector 5244", the user interface portion 5240" shown is provided as a touch screen. User-selectable options for various input functions are provided on the touch screen. The selectable options are arranged as menu soft keys to allow rapid function selection. The arrangement of these options around the puck selector 5244" provides a user interface that is very easy for the user to use quickly and efficiently.

Climate control touch keys 5248" are provided to the left of the puck selector 5244". These provide options for the user to select control of the cabin zone, the temperature in the cabin or the fan speed.

Avionics system touch keys 5230" are provided to the left of the keypad 5246". The avionics system touch keys 5230" provide options for the user to change the input function of the pilot input arrangement to provide a radio frequency input, a transponder code or an altimeter setting (generally a pressure setting).

Autopilot touch keys 5232" are provided to the right of the keypad 5246". The autopilot touch keys 5232" provide options for the user to cause the pilot input arrangement to switch to an input function for inputting a heading, an altitude or a speed for the autopilot.

Infotainment touch keys 5234" are provided to the right of the puck selector 5244". These provide options for the user to change the pilot input arrangement to an input function for selecting entertainment for an entertainment screens of the aircraft, for inputting phone system options or for inputting music options.

Above the rotatable puck selector 5244" there is a display area 5236" of the touchscreen. This is for displaying selection details of the user's selection (e.g. to show the selected input function of the pilot input arrangement) and input data, such as a frequency or transponder code or altimeter setting input by the user via the keypad 5246" or the rotatable selector 5244".

Rotatable Selector

Figure 7:
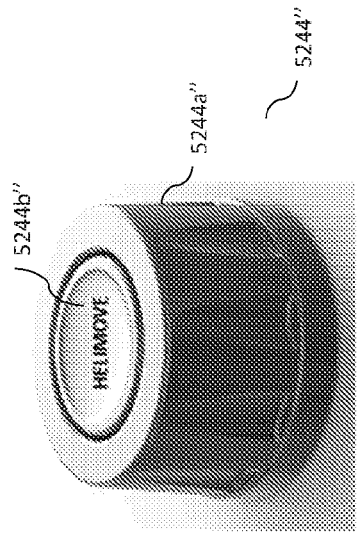
FIG. 7 shows a close-up of a user interface feature of the user interface of FIG. 6.

FIG. 7 shows a close-up of a user interface feature of the user interface of FIG. 6. FIG. 7 shows the rotatable puck selector 5244" of the user interface portion 5240". The rotatable puck selector 5244" comprises a rotatable outer portion 5244a" and a depressible inner portion 5244b".

Rotating the outer rotatable portion 5244a" can allow the user to scroll between selectable options and adjust input values. The outer rotatable portion 5244a" can also be depressed to confirm a selection of an option.

The inner depressible portion 5244b" can be moved between a down position (in which its top is substantially flush with the outer rotatable portion 5244a") and an up position (in which it projects outwards from the outer rotatable portion 5244a".

When released up the inner depressible portion 5244b" can be used as a speed and steering controller for a ground movement system of the aircraft, such as provided by motorising the wheels of the helicopter 100 as described above. In the up position the inner depressible portion 5244b" is rotatable. Rotating the inner depressible portion 5244b" provides a steering input to the ground handling system. In the up position the inner depressible portion 5244b" is also tiltable. Tilting the inner depressible portion 5244b" forwards and backwards provides a speed input for the ground handling system. The further forward from a neutral central position, or more forward force used, the faster the aircraft will move in a forwards direction. The further backward from the neutral central position, or the more backward force used, the faster the aircraft will move a backwards direction.

Moving the inner depressible portion 5244b" from the down to the up position can cause a function selector to change the pilot input arrangement into a ground handling input mode.

Although the above description has been directed towards a helicopter, as will be appreciated the presently described pilot input arrangement is also applicable to other aircraft, such as fixed-wing aircraft (e.g. aeroplanes) and has particular applications for light aircraft.

While a specific architecture is shown, any appropriate hardware/software architecture may be employed. For example, external communication may be via a wired network connection.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A pilot aircraft system control input arrangement for a light aircraft having primary flight controls, the pilot aircraft system control input arrangement integrated into an armrest for a pilot's seat, the armrest providing forearm support for a pilot and having integrated therein or associated therewith a primary flight control and wherein the pilot aircraft system control input arrangement is disposed to be reached by fingers of a pilot with their forearm resting on the armrest, the pilot system control input arrangement comprising:
 a numerical keypad interface for inputting data;
 a rotatable selector for inputting data;
 a function selector operable to switch the pilot input arrangement including the numerical keypad interface and the rotatable selector between at least two input functions that each enable the pilot input arrangement to receive a different type of input using the numerical keypad interface and the rotatable selector, the at least two input functions including;
 a first input function in which the pilot input arrangement is configured to receive input of a first type associated with the first input function using the numerical keypad interface and the rotatable selector; and
 a second input function in which the pilot input arrangement is configured to receive input of a second type associated with the second input function using the numerical keypad interface and the rotatable selector;
 wherein the types of input for the at least two input functions are selected from at least two of the following input categories:
 a pressure setting for an altimeter;
 a transponder code for a transponder,
 a frequency for radio or navigation equipment;
 a course or heading for an autopilot or navigation equipment;
an interfacing arrangement for communicating inputs to at least two aircraft systems selected from:
 an altimeter;
 a transponder;
 a radio;
 a navigation system; and
 an autopilot system.

2. A pilot aircraft system control input arrangement according to claim 1, wherein the function selector is operable to:
 receive a first user selection indicative of a selected aircraft system from the at least two aircraft systems;
 receive a second user selection indicative of the category of input for the aircraft system from the at least two categories of input; and
 switch the pilot input arrangement to being operable to receive an input of the selected category on the basis of the first user selections; and
 cause the interfacing arrangement to communicate an input of the selected category of input received via the numerical keypad interface or rotatable selector to the selected aircraft system.

3. A pilot aircraft system control input arrangement according to claim 1, wherein the function selector comprises one or more physical buttons, softkeys or touchscreen buttons to allow user selection of the at least two different input functions.

4. A pilot aircraft system control input arrangement according to claim 1, wherein the pilot control input arrangement has an area of less than around 600 cm$^2$, preferably less than around 400 cm$^2$, more preferably less than around 200 cm$^2$, and/or wherein the numerical keypad interface, rotatable selector; and function selector are all within 20 cm of each other, preferably within 15 cm or within 12 cm.

5. A pilot aircraft system control input arrangement according to claim 1, further comprising:
 a display operable to display inputs received via the numerical keypad interface and the rotatable selector.

6. A pilot aircraft system control input arrangement according to claim 1, wherein the function selector is further operable to perform one or more of the following operations:
 switch the pilot input arrangement to be operable to receive an airspeed input for the autopilot;
 switch the pilot input arrangement to be operable to receive a control input for a ground handling system, for example speed and/or direction inputs for ground movement, and wherein the interfacing arrangement is configured to communicate inputs to the ground handling system;
 switch the pilot input arrangement to be operable to receive a climate control setting for climate control equipment, and wherein the interfacing arrangement is configured to communicate inputs to climate control equipment for the aircraft, preferably for the aircraft cockpit; and
 switch the pilot input arrangement to be operable to receive at least one of, and preferably all of: a speed input, an altitude input and a navigation input; and wherein the interfacing arrangement is configured to communicate the speed input, the altitude input and/or the navigation input to one or both of an autopilot system; and navigation equipment.

7. A pilot aircraft system control input arrangement according to claim 1, wherein the rotatable selector comprises:
 an outer rotatable portion; and
 an inner depressible button.

8. A pilot aircraft system control input arrangement according to claim 7, wherein the inner depressible button is movable between an up position and a down position, wherein in the up position the inner depressible button protrudes from the surface of the outer rotatable portion, wherein moving the inner depressible button from the down position to the up position causes the function selector to switch the pilot control input arrangement to an input function controllable by the inner depressible button.

9. A pilot aircraft system control input arrangement according to claim 8, wherein the inner depressible button is tiltable to receive user input when in the up position, wherein the pilot aircraft system control input arrangement is arranged to receive inputs for a ground handling system of the aircraft when the inner depressible button is in the up position, and wherein:
tilting the inner depressible button provides input to adjust one of the speed and the steering of the aircraft in ground handling mode; and
rotating the inner depressible button provides input to adjust the other of the speed and the steering of the aircraft in ground handling mode.

10. A pilot aircraft system control input arrangement according to claim 1, wherein the pilot control input arrangement has at least four different input functions selected from:
a pressure setting input function for receiving a pressure setting input and communicating the pressure setting input to an altimeter;
a transponder code input function for receiving a transponder code input and communicating the transponder code input to a transponder;
a radio frequency input function for receiving a radio frequency input and communicating the radio frequency input to a radio;
a navigation frequency input function for receiving a navigation frequency input and communicating the navigation frequency input to a navigation aid;
an autopilot heading input function for receiving a heading input and communicating the heading input to an autopilot;
a navigation heading input function for receiving a heading input and communicating the heading input to a navigation aid;
an autopilot course input function for receiving a course input and communicating the course input to an autopilot;
a navigation course input function for receiving a course input and communicating the course input to a navigation aid;
an autopilot speed input function for receiving a speed input and communicating the speed input to an autopilot;
an autopilot altitude input function for receiving an altitude input and communicating the altitude input to an autopilot.

11. A pilot input arrangement according to claim 1, wherein the pilot control input arrangement is arranged to be disposed centrally in a cockpit of the light aircraft.

12. An armrest for a pilot's seat in a light aircraft, comprising the pilot aircraft system control input arrangement of claim 1.

13. An armrest according to claim 12, further comprising a primary control handle for the aircraft, such as a collective or cyclic or throttle, preferably wherein the control handle is positioned or positionable within 15 cm of the numerical keypad interface and rotatable selector, more preferably within 10 cm or within 5 cm, wherein the primary control handle is a moveable control handle moveably mounted on the armrest for effecting control of one or more aircraft actuators, the moveable control handle being moveable between a closest position being the closest the handle is to the pilot control input arrangement and a furthest position being the furthest the handle is from the pilot control input arrangement, and wherein the pilot control input arrangement is positioned such that when the handle is in the furthest position there is not more than around 25 cm between the handle and each of the numerical keypad interface and the rotatable selector, preferably not more than around 20 cm or 15 cm.

14. An armrest according to claim 13, wherein the armrest comprises:
an elongate channel; and wherein
the moveable control handle comprises:
a first end slidably disposed in the elongate channel for coupling to one or more aircraft actuators; and
a second end for gripping by a pilot,
wherein the moveable control handle is mounted in a hollow of the armrest, such that the top of the moveable control handle remains substantially level with the height of the pilot control input arrangement as it is moved,
and further comprising an elbow support portion configured to be located backwards of the pilot control input arrangement when the armrest is installed in the aircraft.

15. A light helicopter comprising a pilot aircraft control input arrangement according to claim 1 wherein the primary flight control is a collective control integrated with the armrest.

16. A method for receiving pilot aircraft system control input for a light aircraft via a pilot input arrangement having a numerical keypad interface and a rotatable selector and an interfacing arrangement communicably coupled to at least two aircraft systems selected from: an altimeter; a transponder; a radio; a navigation system; and an autopilot system; the method comprising:
providing user-selectable options for at least two input functions of the pilot control input arrangement, wherein the at least two different input functions are selected from:
a pressure setting input function for receiving a pressure setting input and communicating the pressure setting input to an altimeter;
a transponder code input function for receiving a transponder code input and communicating the transponder code input to a transponder;
a radio frequency input function for receiving a radio frequency input and communicating the radio frequency input to a radio;
a navigation frequency input function for receiving a navigation frequency input and communicating the navigation frequency input to a navigation aid;
an autopilot heading input function for receiving a heading input and communicating the heading input to an autopilot;
a navigation heading input function for receiving a heading input and communicating the heading input to a navigation aid;
an autopilot course input function for receiving a course input and communicating the course input to an autopilot;
a navigation course input function for receiving a course input and communicating the course input to a navigation aid;
receiving a user selection of one of the user-selectable options;
switching the pilot input arrangement including the numerical keypad interface and the rotatable selector to operate according to the selected input function;
receiving a user input in the selected input function via the numerical keypad interface or the rotatable selector; and communicating the user input to the relevant aircraft system via the interfacing arrangement:

wherein the at least two input functions include:

a first input function in which the pilot input arrangement is configured to receive input of a first type associated with the first input function using the numerical keypad interface and the rotatable selector; and a second input function in which the pilot input arrangement is configured to receive input of a second type associated with the second input function using the numerical keypad interface and the rotatable selector.

17. A method according to claim 16, further comprising:

displaying a value corresponding to the received user input on a display of the pilot input arrangement or a display communicably coupled to the pilot input arrangement;

receiving a user confirmation of the displayed value;

upon receiving the user confirmation, communicating the user input to the relevant aircraft system;

receiving a user input to adjust the value corresponding to the user input via the rotatable selector; and displaying the adjusted value on the display of the pilot input arrangement or the display communicably coupled to the pilot input arrangement; and wherein receiving a user confirmation of the displayed value comprises receiving a user confirmation of the adjusted value; and wherein communicating the user input to the relevant aircraft systems comprises communicating the adjusted user input to the relevant aircraft system.

18. A method according to claim 16, wherein:

providing user-selectable options for at least two input functions of the pilot control input arrangement, comprises providing user-selectable options for at least two of the following aircraft systems:

an altimeter;

a transponder;

a radio;

a navigation system; and an autopilot system; and upon the user selecting an option corresponding to a radio, a navigation system, or an autopilot system:

providing user selectable options corresponding for an input function corresponding to inputs for the selected one or the radio, the navigation system or the autopilot system.

19. A non-transitory computer-readable medium comprising instructions which, when executed by a computer, cause the computer to carry out the method of claim 16.

* * * * *